United States Patent
Buer et al.

(10) Patent No.: US 7,454,610 B2
(45) Date of Patent: Nov. 18, 2008

(54) SECURITY ASSOCIATION UPDATES IN A PACKET LOAD-BALANCED SYSTEM

(75) Inventors: Mark L. Buer, Gilbert, AZ (US);
Timothy R. Paaske, San Jose, CA (US);
Zheng Qi, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 740 days.

(21) Appl. No.: 10/617,465

(22) Filed: Jul. 11, 2003

(65) Prior Publication Data
US 2004/0128553 A1 Jul. 1, 2004

Related U.S. Application Data

(60) Provisional application No. 60/437,538, filed on Dec. 31, 2002.

(51) Int. Cl.
*H04L 9/00* (2006.01)
(52) U.S. Cl. ........................... 713/153; 713/168
(58) Field of Classification Search ............. 713/153
See application file for complete search history.

(56) References Cited

U.S. PATENT DOCUMENTS

2002/0188839 A1 * 12/2002 Noehring et al. ............ 713/153

2002/0191790 A1   12/2002 Anand et al.
2004/0019789 A1 * 1/2004 Buer ........................... 713/170

FOREIGN PATENT DOCUMENTS

WO   WO 01/05086 A2   1/2001
WO   WO 02/102026 A2   12/2002

OTHER PUBLICATIONS

Communication from the European Patent Office dated May 10, 2005; European Search Report for Application 03029752.
Nahum, E. et al. "Parallelized Network Security Protocols." Network and Distributed System Security, 1996, Los Alamitos, CA, USA, IEEE Computer Society, US, Feb. 22, 1996, pp. 145-154, ISBN: 0-8186-7222-6.

* cited by examiner

*Primary Examiner*—Nasser Moazzami
*Assistant Examiner*—Carlton V Johnson
(74) *Attorney, Agent, or Firm*—Sterne Kessler Goldstein & Fox, p.l.l.c.

(57) ABSTRACT

Methods and associated systems for providing secured data transmission over a data network are disclosed. Security association updates may be provided in a load-balanced system. Before encryption, the system may calculate values for header fields that need to be updated as a result of an encryption process. Encrypted packets may be decrypted by a parallel decryption system. After decryption, the system may calculates value for fields in the header information that need to be updated as a result of the decryption process.

23 Claims, 11 Drawing Sheets

SECURITY ASSOCIATION UPDATES IN A PACKET LOAD-BALANCED SYSTEM

CROSS-REFERENCE TO RELATED APPLICATIONS

This application claims the benefit of U.S. Provisional Patent Application No. 60/437,538, filed Dec. 31, 2002.

FIELD OF THE INVENTION

The invention relates generally to the field of data communications and, more particularly, to systems and methods for providing secured data transmission over a data network.

BACKGROUND

The transmission of data over a data network typically involves sending messages between application programs ("applications") executing on host processors connected to the data network. In a packet network such as the Internet a host processor encapsulates data from an application into data packets to send the data over the packet network. When a host processor receives the data packet from the packet network, the host processor decapsulates the packets to obtain the data. The host processor then provides the data to the appropriate application.

The process of encapsulating data into a packet involves adding information such as source and destination addresses to the data to facilitate transmission of the data over the packet network. Conventionally, the encapsulation process follows a particular packet data protocol. A typical protocol defines the structure of a packet such as the location of the source address and the destination address in the packet. A protocol also may define procedures for routing the packet over the network using those addresses. For example, the components in a data network may use the destination address to determine where to send the packet. The recipient application may use the source address to determine which application sent the packet.

Common protocols used in conjunction with the Internet include Internet protocol ("IP"), transmission control protocol ("TCP"), user datagram protocol ("UDP") and Internet control message protocol ("ICMP"). In general, IP relates to controlling data transfer between host processors, TCP relates to establishing sessions to transfer data between applications, UDP provides a faster but less reliable data transfer mechanism than TCP, and ICMP relates to error messages and network traffic statistics.

Data transmitted over public networks such as the Internet may be encrypted to prevent unauthorized parties from intercepting the data. Typically, a device connected to the network encrypts data using a cipher algorithm and an encryption key. The device sends the encrypted data over the network to another device that decrypts the data using the cipher algorithm and a decryption key.

Several standards have been developed to facilitate secure data transmission over data networks. For example, the Internet security protocol ("IPsec") may be used to establish secure host-to-host pipes and virtual private networks over the Internet. IPsec defines a set of specifications for cryptographic encryption and authentication. IPsec also supports several algorithms for key exchange, including an Internet Key Exchange ("IKE") algorithm for establishing keys for secure sessions established between applications.

There is a perpetual need for increased operating speed and implementation flexibility in data communications systems. On the one hand, developers are continually creating applications that require increasingly greater amounts of data to be sent between system components. On the other hand, end users want their applications to run faster which, in turn, often requires that associated data transfers be performed more quickly.

To increase system performance, some systems incorporate dedicated devices that offload some of the processing operations from the host processor. For example, a network processor may be used to perform some of the packet processing operations. A cryptographic accelerator may be used to perform the cipher algorithms to offload encryption/decryption processing from the host processor.

In a typical system, the primary data flow is from the host processor to the network processor then to the network, and vice-versa. In addition, the network processor routes packets that will be encrypted or decrypted to the cryptographic accelerator. The cryptographic accelerator then routes the encrypted or decrypted packets back to the network processor. In personal computer-based systems, the host processor, network processor and cryptographic accelerator typically are connected via a peripheral component interface ("PCI") bus.

In addition, to address the need for faster data communications, various groups have developed standards that specify high-speed data transfers between components of data communication systems. For example IEEE standards 802.3ab and 802.3z define Ethernet systems for transferring data at rates up to one gigabit per second (1 Gbit/s). IEEE standard 802.3ae defines an Ethernet system for transferring data at rates up to 10 Gbits/s.

The ever expanding need for faster data processing and data transfers and development of the standards discussed above contribute to the need for techniques and circuits capable of achieving high data transfer rates. Moreover, there is an ever-present economic motivation to achieve such results in a cost effective and adaptable manner. Accordingly, a need exists for improved packet processing techniques to support secured data transmission over data networks.

SUMMARY

The invention relates to methods and associated systems for providing secured data transmission over a data network. For example, a device constructed according to one embodiment of the invention provides security association updates in a load-balanced system.

In one embodiment of a system constructed according to the invention, packets to be encrypted are encapsulated before they are encrypted by parallel encryption system. Before encryption, the system calculates values for fields in the header information that need to be updated as a result of the encryption and/or encapsulation process.

In one embodiment, the parallel encryption system provides load balancing. For example, packets associated with a session may be encrypted by any of the encryption processors in the parallel encryption system. In this way, the load associated with any session may be efficiently processed.

In one embodiment of a system constructed according to the invention, encrypted packets are decrypted by a parallel decryption system. After decryption, the system calculates values for fields in the header information that need to be updated as a result of the decryption process.

In one embodiment, an address associated with the fields to be updated is sent with the encrypted packets to the decryption processors. After decryption, the updateable fields are read from data memory using the address and then updated as necessary.

In one embodiment of a system constructed according to the invention, the updateable fields include one or more of a sequence number, a byte count and a sequence window. Such fields may be implemented as specified by IPsec.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION OF ILLUSTRATIVE EMBODIMENTS OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
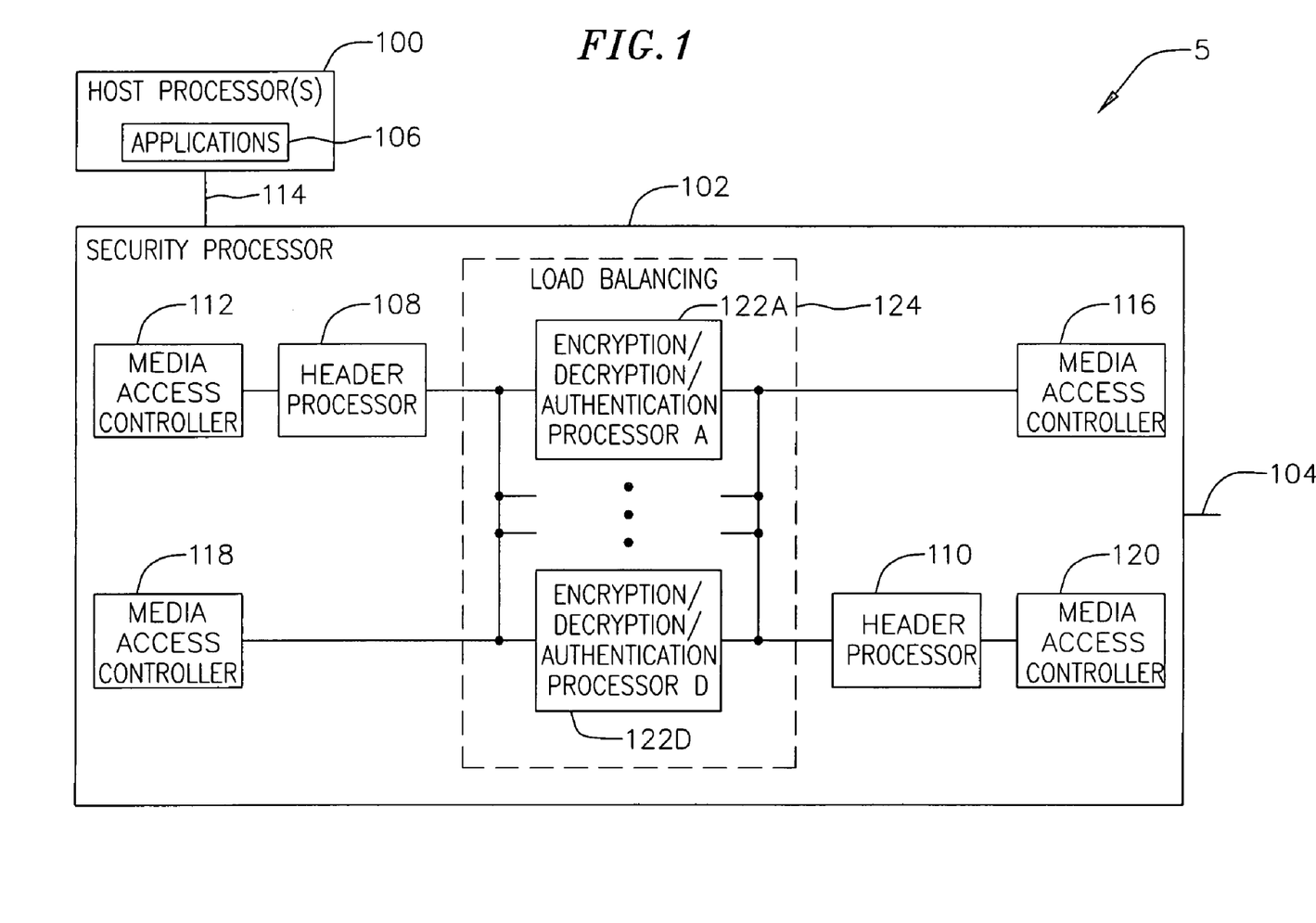
FIG. 1 is a block diagram of one embodiment of a packet processing system constructed in accordance with the invention.

FIG. 1 is a block diagram of one embodiment of a packet processing system S constructed according to the invention. An application 106 executing on a host processor 100 establishes a connection with another application (not shown) via a packet network 104. To provide secure data transmission, a security processor 102 encrypts, decrypts and/or authenticates some of the data the application 106 sends to and receives from the other application over the packet network 104. As used herein, the term security processor refers to one or more processing components that encrypt, decrypt or authenticate data or perform any combination of these operations.

The embodiment of FIG. 1 may communicate over the packet network 114 using the TCP/IP protocols. Thus, the host processor 100 and/or an associated processor includes TCP/IP processing that establishes TCP sessions with the other applications. The TCP/IP processing encapsulates session data being sent over the network and decapsulates session data received from the network 104.

The host processor 100 may communicate with the security processor 102 via a packet link 114. Thus, the host processor 100 may include a media access controller (not shown) that communicates with a media access controller 112 in the security processor 102. Another media access controller 116 in the security processor 102 communicates with the network 104.

The security processor may support the IPsec protocol. For example, the security processor may include parallel encryption/decryption/authentication processors 122A-D that encrypt TCP/IP packets received from the host processor 100 and decrypt packets received from the packet network 104. In addition, the security processor 102 may encapsulate the encrypted packets as IPsec packets for transmission over the packet network 104 and decapsulate IPsec packets received from the packet network 104.

In accordance with conventional practice, the encryption/decryption/authentication processors 122A-D may use security associations in conjunction with their encryption/decryption/authentication algorithms. For example, a security association may specify an encryption algorithm to be used to encrypt data from a particular application. A security association also may include an encryption key used by the encryption algorithm.

In practice, an application may establish several connections with other applications via the packet network 104. To maintain the security of these connections, the security processor may use different security associations to encrypt the data for each of these connections.

In accordance with one embodiment of the invention, the security processor 102 provides security association updates in a load-balanced system. In one embodiment for outbound packets, a header processor 108 encapsulates packets received from the host processor 100 via media access controller 112 before the packets are encrypted by the parallel processors 122A-D. The header processor 108 calculates values for fields in the header information that need to be updated as a result of the encryption process.

In one embodiment for inbound packets, the parallel processors 122A-D decrypt encrypted packets received via media access controller 118. After decryption, a header processor 110 calculates values for fields in the header information that need to be updated as a result of the decryption process.

Figure 2:
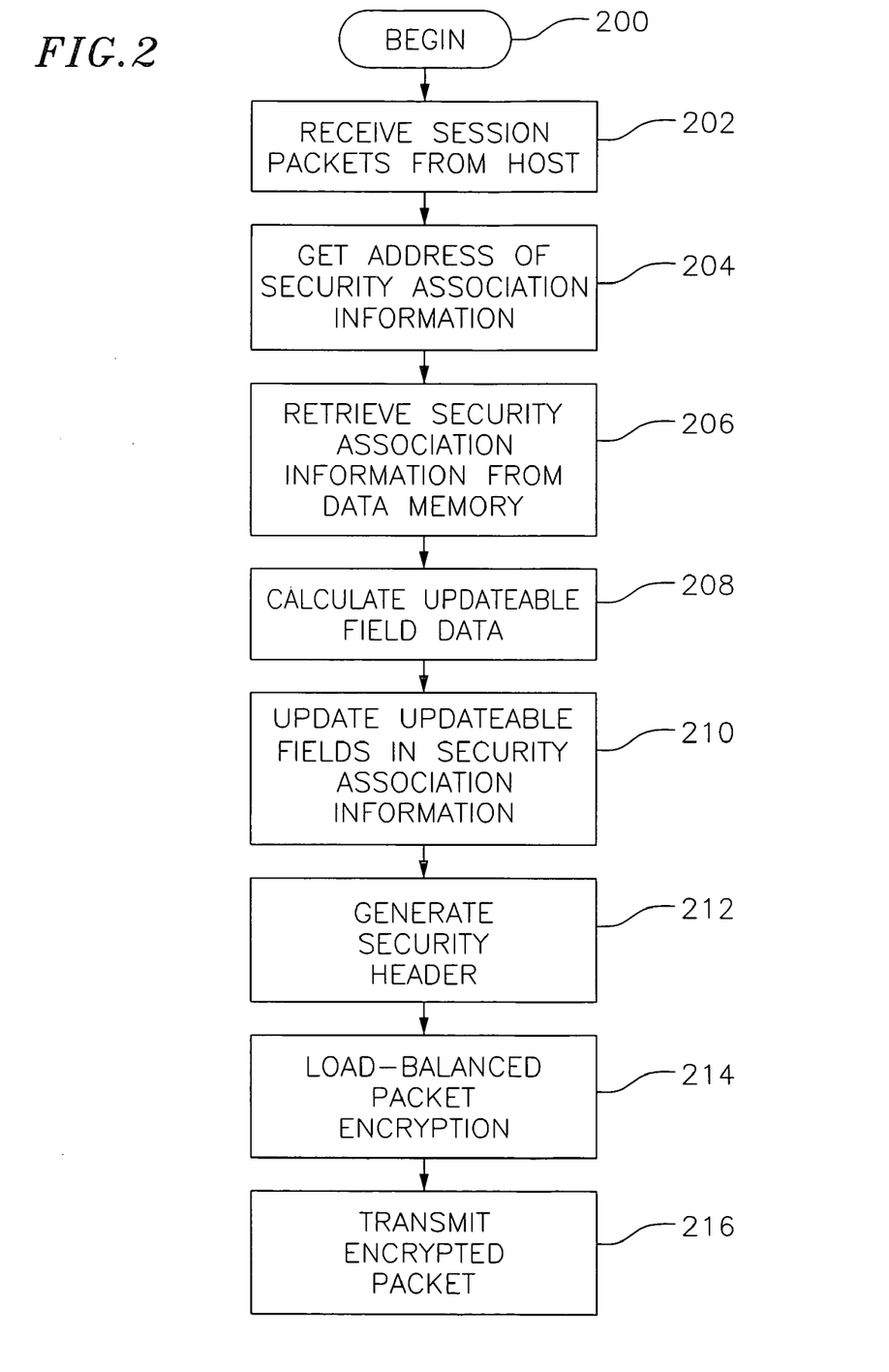
FIG. 2 is a flowchart representative of one embodiment of outbound operations that may be performed in accordance with the invention.
Figure 3:
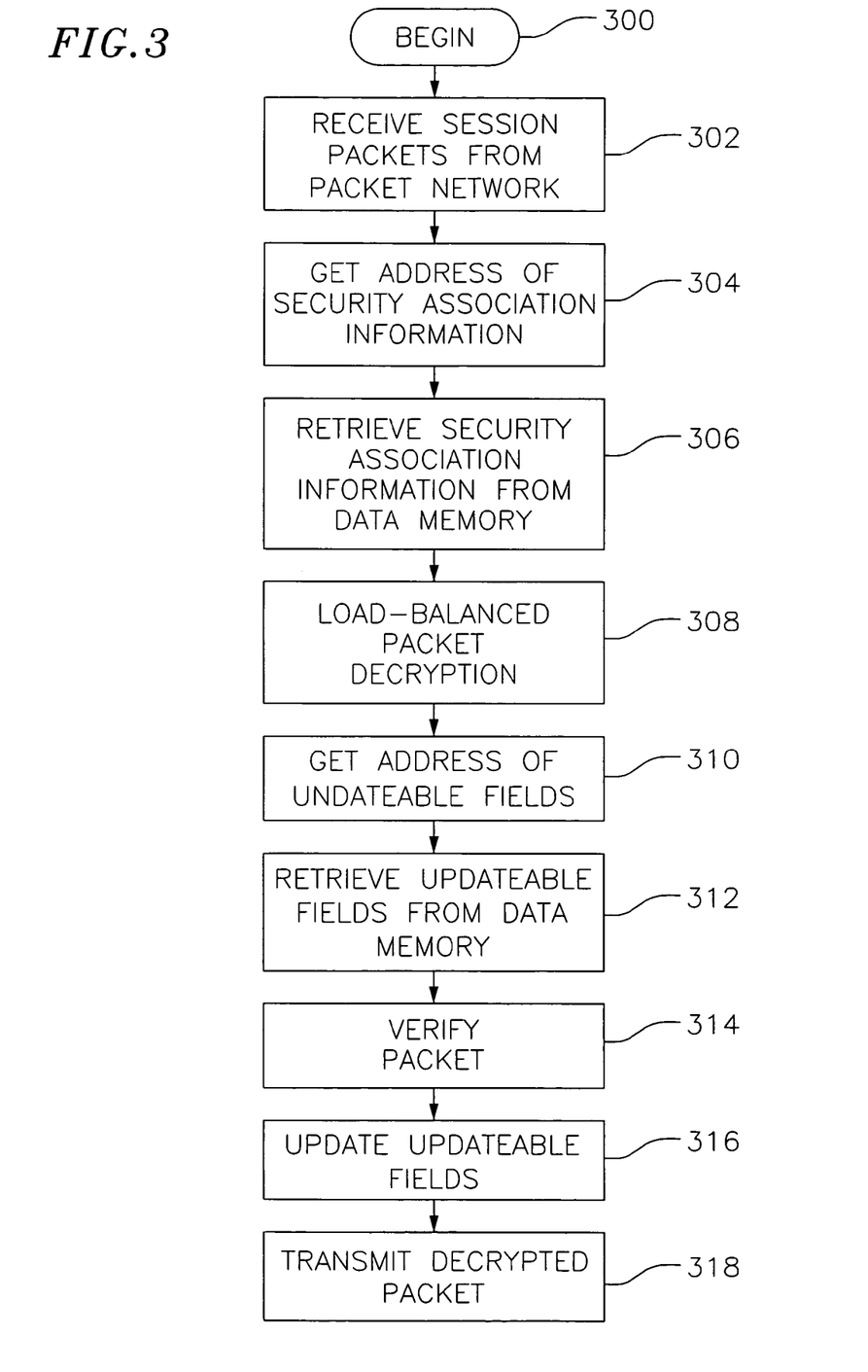
FIG. 3 is a flowchart representative of one embodiment of inbound operations that may be performed in accordance with the invention.

Operations of the system of FIG. 1 will be treated in more detail in conjunction with the flowcharts of FIGS. 2 and 3. FIG. 2, beginning at block 200, relates to outbound operations. FIG. 3, beginning at block 300, relates to inbound operations.

In this example, applications executing on the host processor establish sessions with other applications via the packet network. For secure sessions, this may include generating security association information for each session.

In one embodiment, the host processor may configure the security processor using one or more configuration packets. For example, the host processor may send security association information to the security processor via a configuration packet. When the security processor receives the configuration packets, the security processing extracts the security association information and stores it a local data memory.

Turning now to FIG. 2, as represented by block 202 when the applications communicate via the sessions, the host processor generates packets for each session and sends the packets to the packet network via the security processor.

As represented by block 204, when the security processor receives a session packet that is to be encrypted, header processing in the security processor processes the packet to locate the security association information for that packet. For example, the header may contain the address of the security association in the local data memory. Alternatively, the security processor may extract session information from the packet and send the session information to a hashing circuit. This session information may include, for example, destination address, source address, protocol, destination port and/or source port. In this case, the hashing circuit hashes the session information to generate the address.

As represented by block 206, based on the address, the security processor retrieves the security association information associated with that session from the data memory. This security association information includes updateable fields such as sequence number and byte count.

Next, as represented by block 208, the security processor calculates new values for the updateable fields and updates these fields in data memory (block 210). These new values represent, for example, the new sequence number and the new byte count for the packet once it has been constructed.

As represented by block 212, the security processor generates the header information and encapsulates the packet in the new header. This new packet, then, will include the proper sequence number and byte count for the encryption and encapsulation process.

As represented by block 214, the security processor load balances the packet encryption process by distributing the packets to one of several parallel encryption processors. Thus, packets association with the same session may be sent to different encryption processors.

After the packets are encrypted, they are sent routed over the packet network to the appropriate destination (block 216).

Turning now to FIG. 3, as represented by block 302 once a session is established the security processor will receive session packets from the packet network. If the packet is encrypted the security processor may attempt to decrypt it.

As represented by block 304, the security processor processes the packet to locate the security association information for that packet. For example, the header may contain an SPI that is the address of the security association in the local data memory. Alternatively, the security processor may extract session information from the packet and send the session information to a hashing circuit.

As represented by block 306, based on the address, the security processor retrieves the security association information associated with that session from the data memory. This security association information may include updateable fields such as sequence number and byte count. Alternatively, in one embodiment, this information may include the address of the updateable fields rather than the information from the fields.

Next, as represented by block 308, the security processor sends the packet and the security association information to the decryption processors. Again, the security processor load balances the packet decryption process by distributing the packets to one of several parallel decryption processors.

After a packet is decrypted, header processing in the security processor extracts the updateable field information (block 310) and retrieves the updateable field information from the local data memory, as necessary (block 312).

The header processing then verifies that the packet may be accepted and updates the updateable fields. For example, the header processing may verify that the sequence number of the packet is acceptable (block 314), modify the sequence window entries and adjust the byte count (block 316).

As represented by block 318, if the packet is accepted, the security processor sends the decrypted packet to the host processors.

Figure 4:
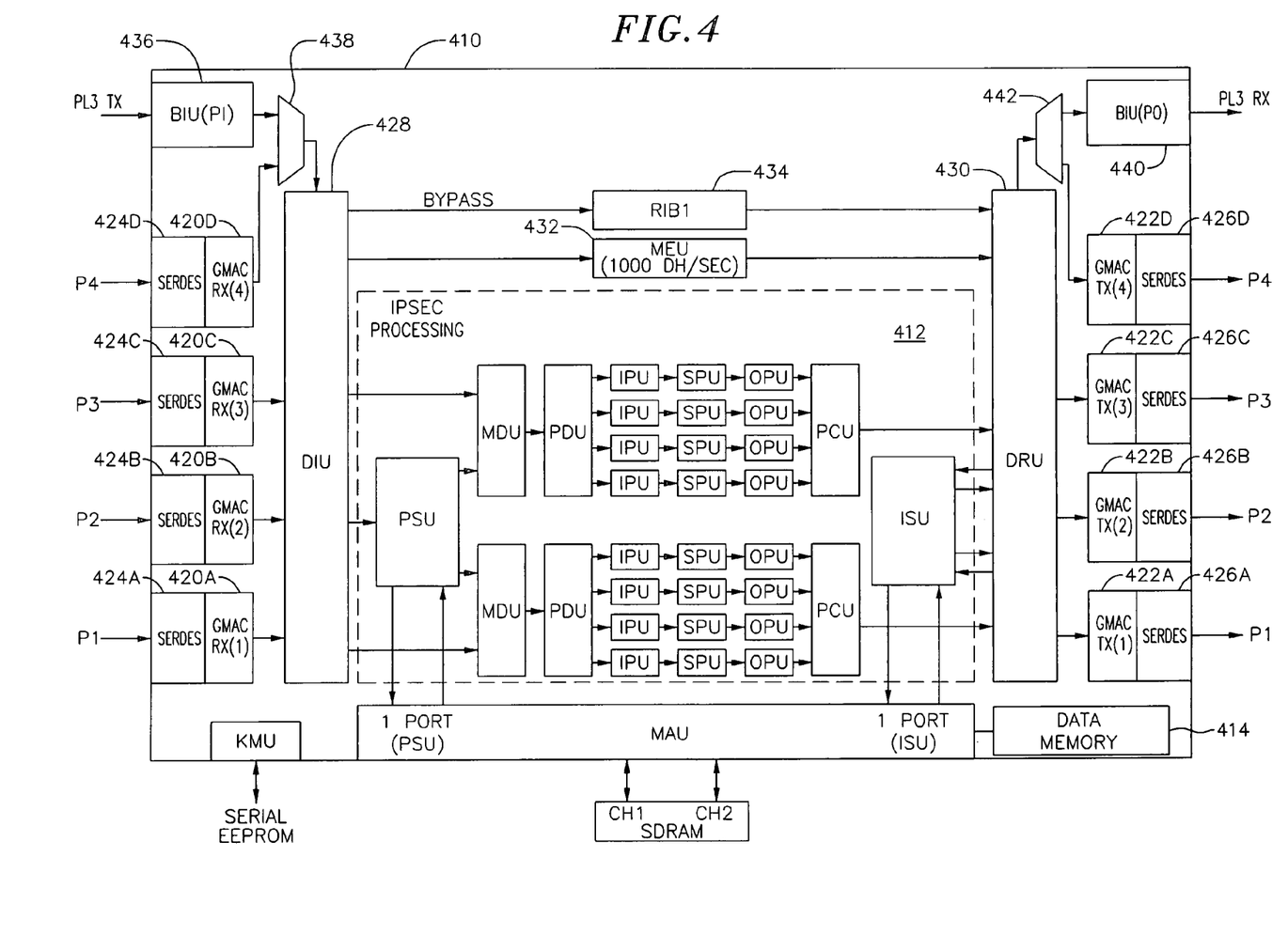
FIG. 4 is a block diagram of one embodiment of a security processor constructed in accordance with the invention.

Referring now to FIG. 4 one embodiment of a security processor will be treated in more detail. FIG. 4 illustrates one implementation of a Gigabit security processor 410. This implementation includes quad 10/100/1000 GMACs (receivers 420A-D, transmitters 422A-D) with integrated SERDES (receivers 424A-D, transmitters 426A-D). Each of the GMACs may be configured to interface with a host side network or a line side network. The network inputs and outputs for the GMACs are labeled P1-P4.

The Gigabit security processor 410 also includes a PL3 interface. The input to the PL3 receiver 436 is labeled PL3 TX. The output of the PL3 transmitter 440 is labeled PL3 RX.

One of the GMACs may be swapped with a PL3 interface. On the receive side, this is accomplished by a multiplexer 438 that selects either the signal from PL3 receiver 436 or the GMAC RX(4) 420D to be sent to a data input unit ("DIU") 428. On the transmit side, a demultiplexer 442 sends output data from a data routing unit ("DRU") 430 to either the PL3 transmitter 440 or the GMAC TX(4) 422D.

The DIU 428 manages packet flow from the receiver inputs into the processing path of the Gigabit security processor 410 and may extract and process header information. Packets may be routed to a bypass path 434, for example, when no security processing is necessary. This would be the case for non-IPsec packets flowing through the Gigabit security processor 410. Packets may be routed to a public key processing component 432. Packets also may be routed to an IPsec processing component 412 based, for example, on analysis of packet header information as discussed herein. The Gigabit security processor 410 includes an internal data memory 414 as well a memory interface component to access external data memory such as a synchronous dynamic random access memory ("SDRAM") 416. Additional details of one embodiment of the processing path of a Gigabit security processor are described in U.S. patent application Ser. No. 09/610,798 filed on Jul. 6, 2000 and entitled "DISTRIBUTED PROCESSING IN A CRYPTOGRAPHY ACCELERATION CHIP," the entire contents of which are hereby incorporated by reference.

The DRU 430 manages data from the processing path of the Gigabit security processor 410 to be sent to the device outputs. Thus, the DRU 430 routes packets to the GMAC transmitters 422A-C and the demultiplexer 442.

Figure 5:
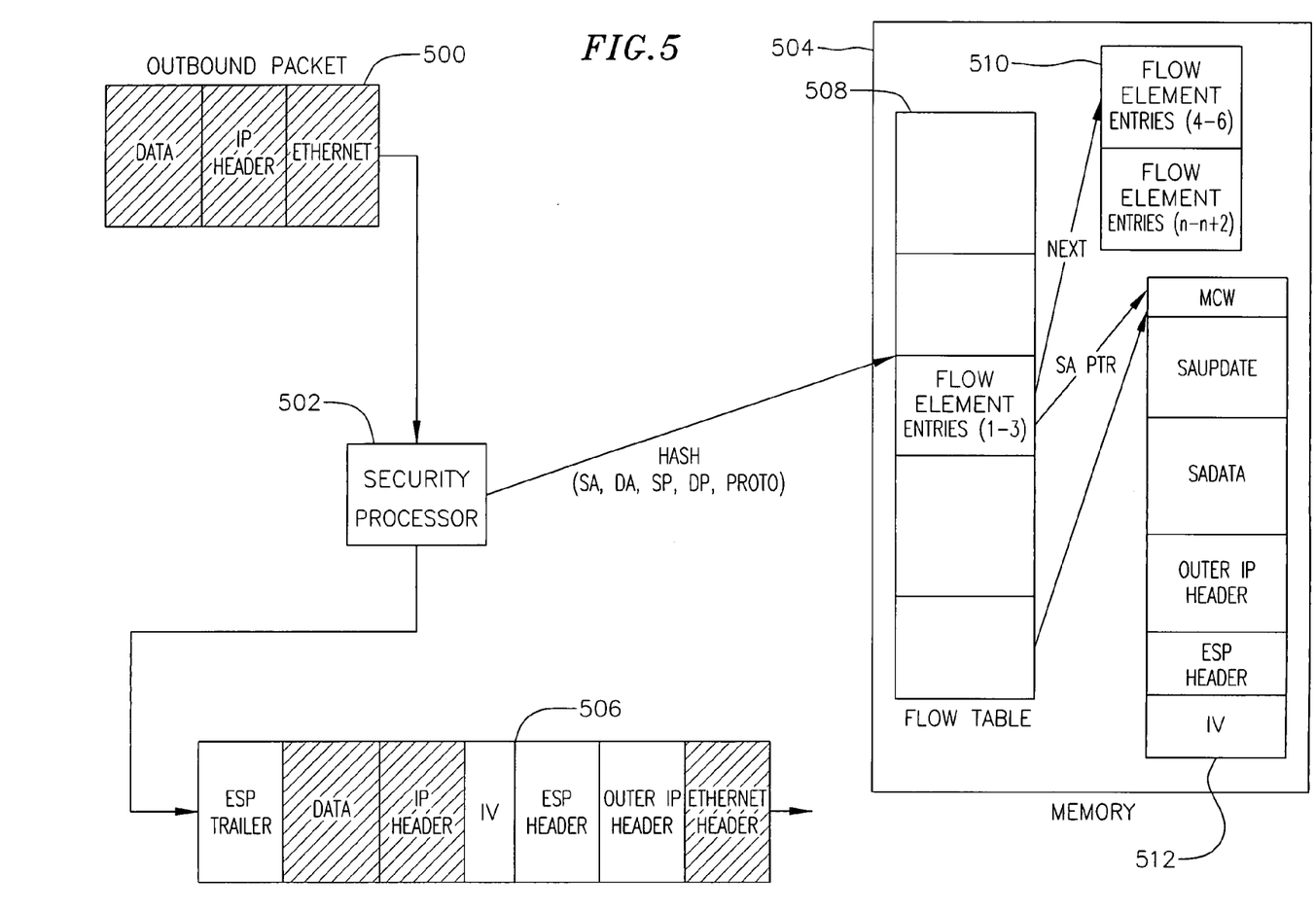
FIG. 5 is a diagram representative of one embodiment of outbound data flow in accordance with the invention.

FIG. 5 depicts one embodiment of outbound data flow. The Ethernet packet 500 enters the security processor 502 without an MCW. A default MCW is added by the security processor that indicates this packet is an outbound packet type. The security processor extracts the programmed selectors (protocol, source address, destination address, source port, destination port) from the packet. The selectors are hashed down to an address as an entry point into the outbound flow table 508.

The selectors are compared by the security processor with the data in the flow table 508 until there is an exact match. The selectors are compared as an ordered linked list (the first three IPv4 entries are in the Flow Table 508, the next 'n' entries are linked to a separate address 510 in memory 504).

Once the selectors have been resolved, the flow is uniquely identified and contains a pointer to the SA Data Structure 512. The security processor prepends the SA Data Structure (MCW, SAUpdate, SAData, Outer IP Header, Security Header, etc.) to the front of the packet.

The combination of the prepended SA Data Structure and the original packet are merged to construct a packet. The BufferData field fetched from memory as part of the SA Data Structure (constructed by the host) is placed after the incoming Ethernet header for Tunnel mode packets (after the IP header for Transport mode packets). If the BufferData field contains an Ethernet header (EthenetMode=1 in the MCW), the incoming Ethernet header is replaced with the one from memory. The structure 512 in memory 512 is allowed to add HostContext words to the packet. These HostContext words can be used by the host processor to identify the flow after the packet has been processed by the security processor 502.

The resulting packet stream 506 contains all of the information required to completely process the packet for an IPsec operation. The processed packet 506 shown in FIG. 5 is then sent out of the security processor 502 using the DropMCW option to remove the MCW and packet status. The resulting packet is ready for transmission on the wire.

Figure 6:
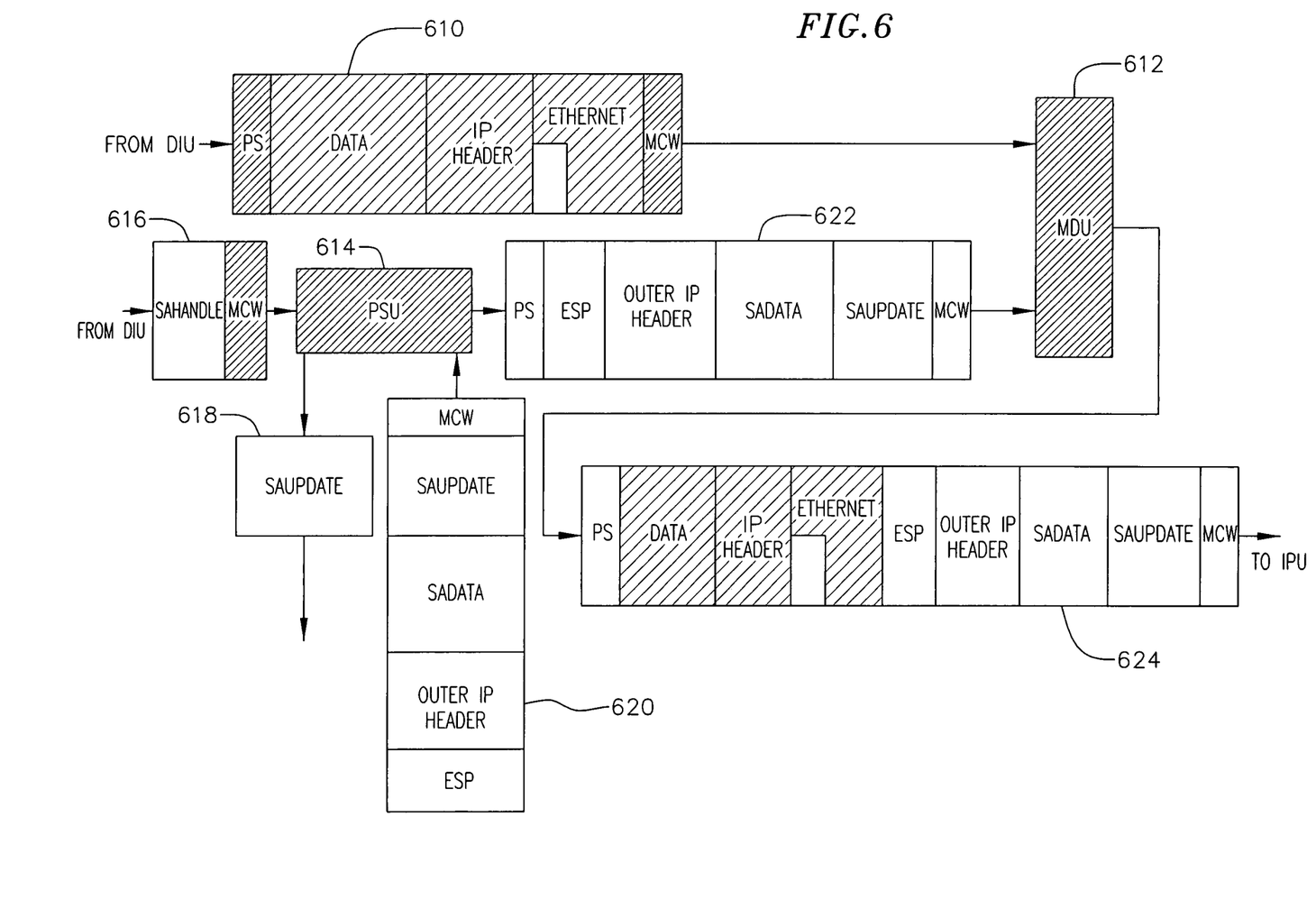
FIG. 6 is a diagram representative of one embodiment of outbound packet flow in accordance with the invention.

FIG. 6 depicts one embodiment of outbound packet flow. As depicted in FIG. 6, the security processor includes a policy lookup unit ("PSU") 614 and a merge data unit ("MDU") 612. The policy lookup unit 614 receives packet information 616 from the data input unit ("DIU") 428 (FIG. 4) to retrieve from a data memory 620, when applicable, a header to append to an incoming packet 610 and security association information used to encrypt the packet 610. The merge data unit 612 merges the header and security association information 622 with the incoming packet 610 from the data input unit 428.

Thus, the MDU provides a traffic merge functionality between the PSU and the DIU. The MDU uses the two management control words ("MCWs") from the PSU to merge data from both the PSU and the DIU (bitwise OR of the MCWs). The MDU gives priority to the locally fetched data fields when both MCWs indicate the presence of the field.

The BufferData field is inserted after the Ethernet header for Tunnel mode packets and after the IP header for Transport Mode packets. The Ethernet header is treated as separate portion of the BufferData field when EthernetMode=1 (i.e. the Ethernet header can be replaced by data in local memory) and is always used to replace the original Ethernet header.

The MDU merges any errors generated by the PSU into the PacketStatus of the packet received from the DIU for the requested MCW. The MDU sends the resulting merged packet 624 to the first component of the encryption processor, the input parsing unit ("IPU").

One embodiment of a security processor that provides a per packet search function to locate security associations for inbound and outbound packets will now be discussed. The security processor associates every packet with a flow based on selectors that are extracted from the packet. The selector extraction process may depend on the packet type. Three common packet types include:
 1) Outbound Packets (non-IPsec);
 2) Inbound IPv4/IPv6 Packets (non-IPsec); and
 3) Inbound IPv4/IPv6 IPsec Packets.

The three packet types are each mapped into their own flow table each with a unique flow table base address. Selectors that the security processor may extract from an IP (outbound or inbound non-IPsec) packet include the following:
 1) Source Address;
 2) Destination Address;
 3) Protocol;
 4) Source Port (TCP, UDP, ICMP);
 5) Destination Port (TCP, UDP, ICMP); and
 6) User Defined (3 Bytes).

Selectors that the security processor may extract from an IPsec packet (inbound IPsec) packet include the following:
 1) Security Parameter Index—SPI (AH, ESP);
 2) Destination Port (TCP, UDP, ICMP);
 3) Protocol; and
 4) User Defined (3 Bytes).

Each selector may be individually enabled for each flow table. The user defined bytes may be individually added to the flow selectors. The three user defined bytes may each have the following selectable options for extracting data from the packet 3:
 1) 8 bit Offset (0-255 bytes);
 2) Starting Location for Offset (BufferData or IP Header);
 3) Enable for IPv4 Packets; and
 4) Enable for IPv6 Packets.

The selectors are extracted from the packet by the security processor into an SAHandle field. The selectors are hashed by the security processor into an address (8-24 bits) that is used as an entry point into the flow table (see FIG. 5). The SPI can optionally be used as the entry point into the flow table or as the direct address of the security association data. Any of the selector fields that are not extracted by the security processor may be set to zero in the generated SAHandle field and not used in the flow lookup (zero valued selectors do not affect the hash calculation). The host can optionally provide the SAHandle (selectors) directly to the security processor.

The ICMP "type"/"code" (upper 16 bits) are mapped into the source port location (same location in the packet as UDP or TCP) of the selectors. A 16 bit mask value is applied to the source port selector location in the generation of the SAHandle for all ICMP traffic. The destination port selector is always set to zero for ICMP packets.

Figure 7:
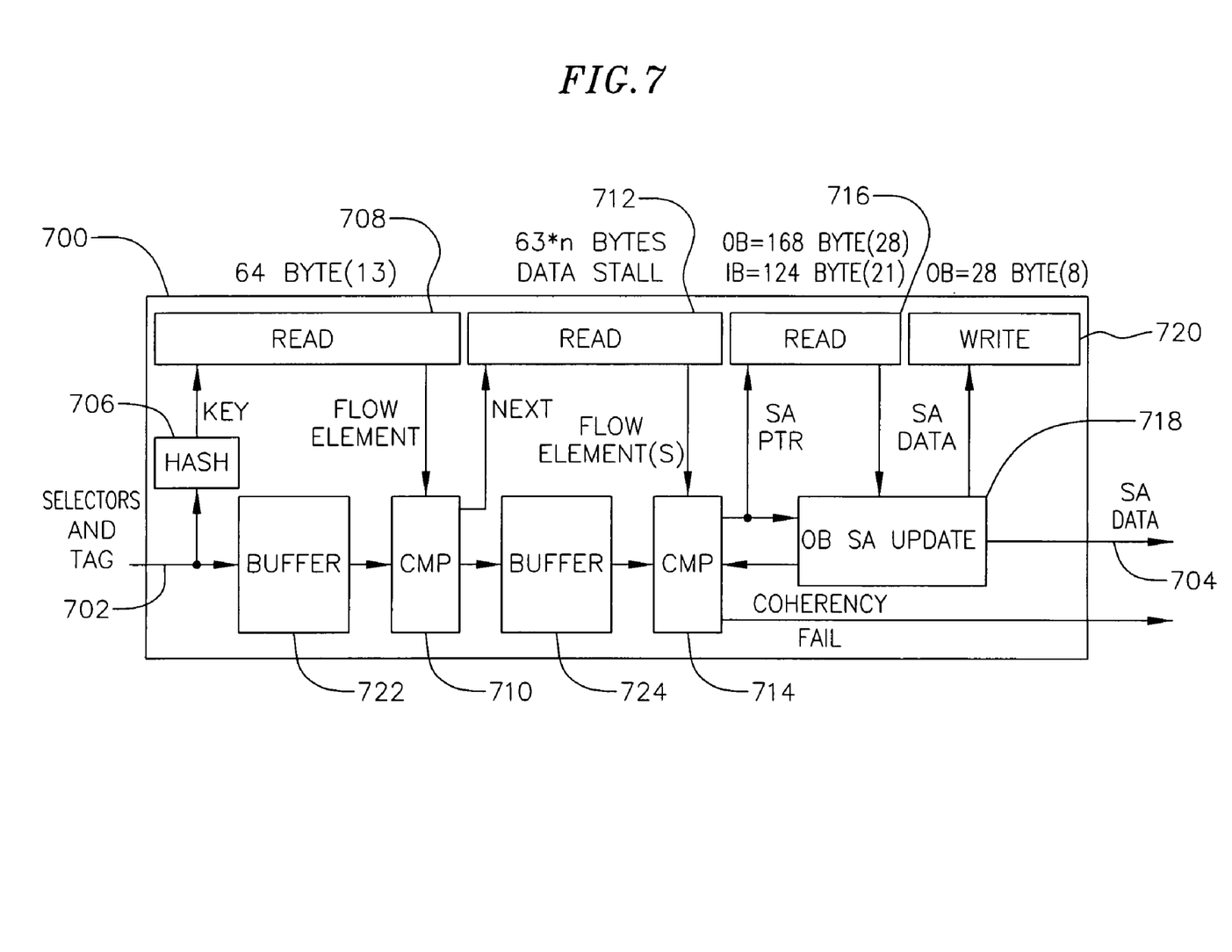
FIG. 7 is a block diagram of one embodiment of a policy lookup unit constructed in accordance with the invention.

FIG. 7 depicts one embodiment of a policy lookup unit 700. The PSU reads information from memory 708 and prepends the information to the packet. The location in memory of the SA Data Structure can be specified directly or by selectors in the SAHandle field as represented by input 702. The PSU may use the selectors to search a hash based flow table 706 to determine the location of SA Data Structure. This architecture may be used for both inbound, outbound and non-Ipsec packets, providing an extremely flexible mechanism that allows each packet to be classified into an established flow.

The memory is managed by the host processor using memory access packets. The memory access packets are serviced by the PSU in order with all packet requests. The PSU issues memory read/write commands as well as flow update commands.

The flow updates are special access packets for which the PSU calculates the hash entry point into the flow table. The PSU searches out the previous flow selectors (match found) or the next empty position in the flow table (new flow). It then updates the flow table with the new flow selector values.

The PSU block receives a set of selectors in the SAHandle from the DIU along with the MCW. The PSU hashes the selectors to generate an address unless the address is provided directly. The SPI is typically used directly as the entry into the hash table for inbound IPsec packets (indicated in the SAHandle). In a controlled system, the SPI may be used directly as the address of the SA Data Structure (no flow table required for inbound IPsec packets in this case, however the SA Data Structure size must be fixed to one of four preset values for all inbound security associations when using this method).

The resulting hash address is used to read the flow element from a hash table (different base address for separate hash tables). The flow element contains one or more flow entries with selectors that are used to match the original packet selectors.

A compare unit 710 in the PSU compares the selectors to the ones found in the flow entries in sequential order. If the selectors are not found within the base flow element, the rest of the flow elements are fetched by the PSU. These flow elements are also searched in order until a match is found. If no match is found, the packet is flagged with an error 2.

In one embodiment the PSU can process 5 Mpps for flow lookups when the flow entry is found in the first flow element (3 entries for IPv4, 1 entry for IPv6). When the PSU goes beyond the first flow element, data may be stalled in the pipeline (i.e. could look into 2 elements for 128 byte packets or 4 elements for 256 byte packets at line rate).

Once the selectors have been resolved (i.e. the flow is found), the PSU compare block 714 fetches the SA Data Structure from the SA_PTR location in the flow entry with the matching selectors.

The policy data (SPData) for an outbound type packet is compared to the selectors in the SAHandle by the PSU. If the policy data comparison fails, any further processing of the packet is not done by the security processor (the PSU does not update the security association data on a policy failure for outbound packets). Since the PSU does not drop packets, it simply provides the MDU with an error flag for this packet. The MDU will add the error flag to the packet status. The PSU always consumes the SPData field for an outbound packet.

If the SAUpdate field is present for an outbound packet type, the OB SA Update block 718 in the PSU will increment the sequence number and modify the byte count of the packet of the SAUpdate field and write the result back to memory 720. The PSU manages the coherency of this operation locally using the address of the SA Data Structure as exclusive. Since the byte count is based on the "protected" byte count value, the PSU adds the packet length plus a fixed value (indicated in the SAUpdate field) per packet that it processes.

The PSU enforces the soft and hard expiration indications for lifetime on all packets (notifications passed to the ISU for expiration generation on inbound packets). The PSU enforces the soft and hard expirations of lifebyte and sequence number exhaustion for outbound packets. The PSU constructs the expiration message sending it through the MDU datapaths.

The packet length (TOTAL_LEN) and IP header length (HDR_LEN) are passed to the PSU from the DIU with the selectors in the SAHandle field (automatically generated by the security processor). The header length is subtracted from the protected byte count for Transport ESP packets indicated in the SAData field.

The protected byte count equations are the following:
HDR_LEN=Length of Header+Length of Options
IF (packet.version=IPv4) then
TOTAL_LEN=packet. total_length
ELSE IF (packet.version=IPv6) then
TOTAL_LEN=packet. payload_length
ENDIF
IF (SAData.transport=TRUE) then
AH_IPV4_BC=TOTAL_LEN+SAData. FixedBC
AH_IPV6_BC=HDR_LEN+TOTAL_LEN+SAData. FixedBC
ESP_IPV4_BC=TOTAL_LEN+SAData.FixedBC—HDR_LEN
ESP_IPV6_BC=TOTAL_LEN+SAData. FixedBC
ELSE
AH_IPV4_BC=TOTAL_LEN+SAData. FixedBC
AH_IPV6_BC=HDR_LEN+TOTAL_LEN+SAData. FixedBC
ESP_IPV4_BC=TOTAL_LEN+SAData. FixedBC
ESP_IPV6_BC=HDR_LEN+TOTAL_LEN+SAData. FixedBC
ENDIF The AH protected byte count is used for an AH-ESP bundle.

The PSU consumes the SAHandle field that it received from the DIU. It provides the data fetched from memory on the correct channel to the targeted MDU, as represent by line 704.

Referring again to FIG. 4, the load-balanced encryption/decryption/authentication processors will be discussed in more detail. This portion of the system consists, in general, of the packet distribution units ("PDU"), input parsing units ("IPU"), security processing units ("SPU"), output processing units ("OPU") and packet convergence units ("PCU") depicted in FIG. 4.

The security processor contains two independent PDU blocks. Each distributor distributes packets into one of the four crypto units. The distributor can be configured to distribute packets for maximum crypto unit usage:

Lowest Load: This scheme balances the load among the crypto units by monitoring the load of their input FIFOs. Each packet is distributed to the active crypto unit with the lowest load. This scheme is selected when the distributor configuration register configuration field, rr_threshold, is set to 0x 0.

Round Robin: This scheme balances the load among the crypto units by distributing the packets in a round-robin fashion. Upon reset, the round-robin selector is initialized to take a packet from crypto unit 0. If the selected round-robin crypto unit is full then it is skipped. This scheme is selected when the distributor configuration register configuration field, rr_threshold, is set to 0x1FF.

The PDU provides a mechanism to disable individual crypto units. The PDU provides a secondary TAG to the packet that isused by the PCU to provide strict ordering with the pipeline.

The IPU performs the tunnel and transport mode header processing (encapsulation for outbound packets) as indicated in the SAData field. The IPU provides the packet parsing necessary to extract the cryptographic offsets and lengths required for AH, ESP and AH-ESP processing (inbound and outbound packets). These offsets are derived directly from the packet for IPv4 and IPv6 packets including the Ethernet header. The IPU parses the packet to generate an internal BufferDescriptor and Mutable-FieldMask for the SPU. Generic packets include the BufferDescriptor and Mutable-FieldMask with the input packet to allow the host to override the values parsed by the IPU. The IPv4 checksum is calculated (or checked) by the IPU based on the SAData field configuration.

The IPU verifies the SAData field to ensure all rules are met and the proper data is present. An ErrorCode is inserted for all packets without a properly formatted SAData field. All subsequent processing is not performed by downstream blocks when an error is detected in the IPU. The IPU decrypts the SAData cryptographic and authentication key values (as indicated in the SAData flags) using the key stream provided by the KMU.

Each SPU performs the cryptographic operations required by IPsec: 3DES, DES, HMAC-SHA-1-96, and HMAC-MD5-96. In addition to the required IPsec algorithms, each crypto unit is capable of performing 128 Bit block AES encryption with key sizes of 128, 192 and 256 Bits. The SPU consumes the SAData, MutableFieldMask and BufferDescriptor fields from the packet. The SAData keys are dropped by the SPU for all SPU processed packets. The SPU provides the IV generation required for outbound packets.

Each SPU is decoupled from the other units with input and output FIFOs. The aggregation technique provides full performance cryptographic performance under all circumstances, except when the packet size exceeds 2 Kbytes. In one embodiment the minimum performance is 600 Mbps for all packets sizes up to 64 Kbytes. The dual issue pipeline design provides greater than 1.2 Gbps for packets up to 9 Kbytes.

The OPU decapsulates the IPsec headers according to the SAData field parameters for inbound packets. The SAUpdate filed and decapsulation parameters are generated (includes protected byte count, sequence number from the decapsulation and packet status) and forwarded to the ISU (through the DRU). The OPU provides fragmentation on packets that are larger than the SAData. PathMTU.

While the Distributor optimizes usage of the crypto units, it does not attend to packet order. Before packets leave the security processor, they are reordered by the Convergence unit. The PCU convergence unit merges the flow of packets from four crypto units back to a single flow using a strict ordering policy. The strict ordering scheme guarantees FIFO ordering for all packets. The PCU uses the tag from the PDU to ensure that each packet is returned to the stream in the proper order.

Additional details of a load-balanced system may be found in U.S. patent application Ser. No. 09/610,798 discussed above.

Figure 8:
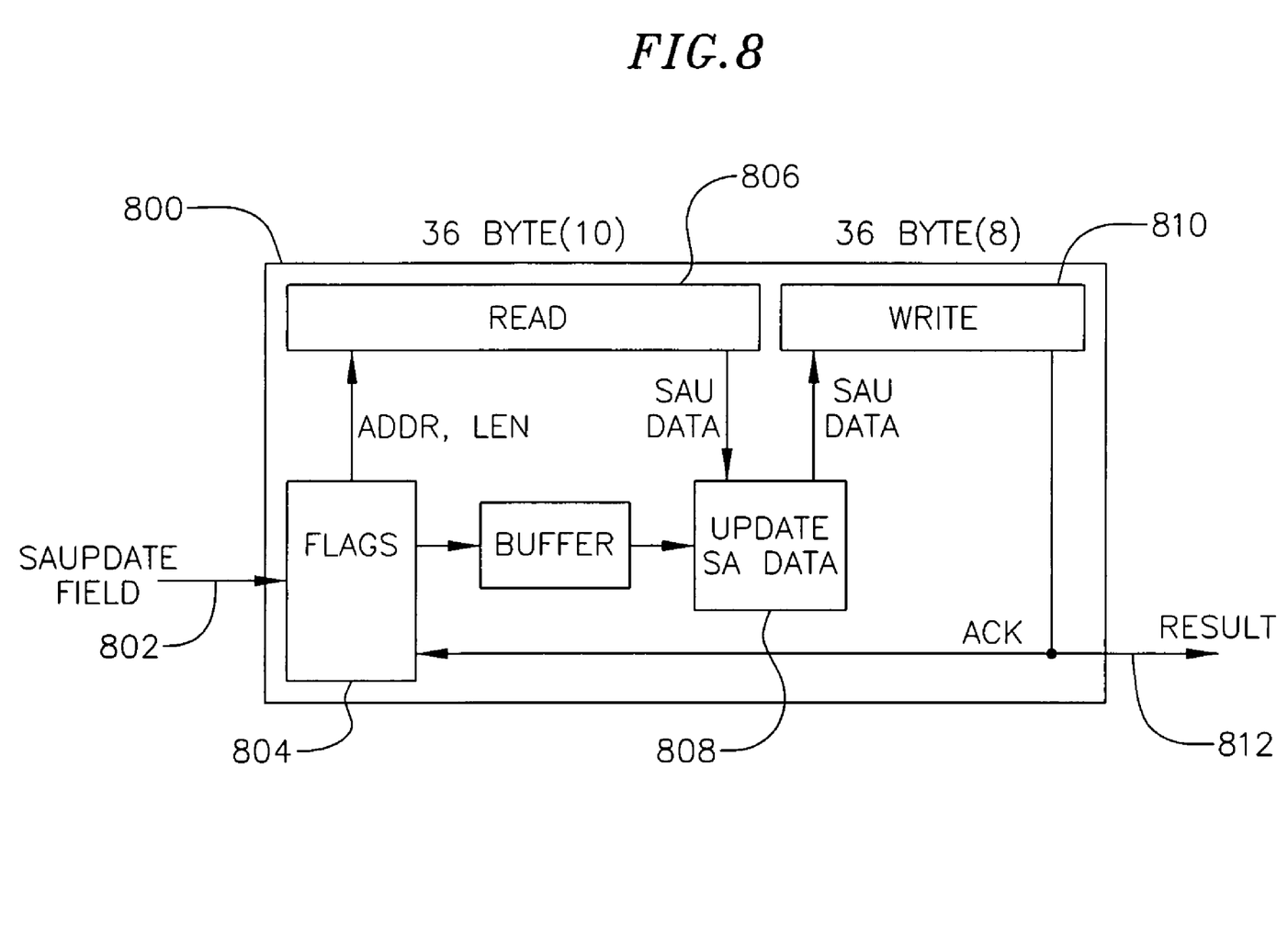
FIG. 8 is a block diagram of one embodiment of an inbound update unit constructed in accordance with the invention.
Figure 9:
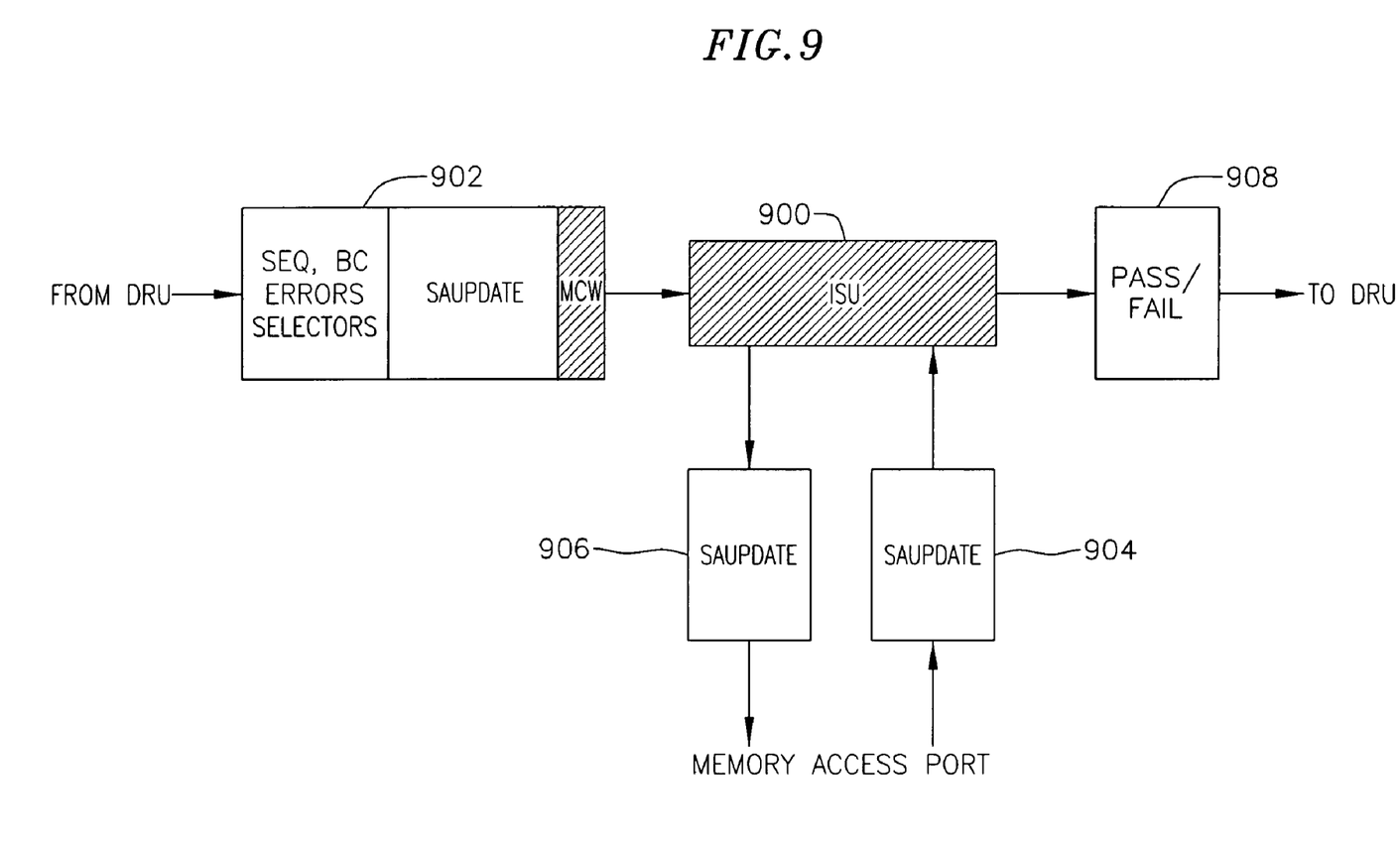
FIG. 9 is a diagram representative of one embodiment of packet flow in accordance with the invention.

FIG. 8 depicts one embodiment of an inbound update unit ("ISU") 800 and FIG. 9 depicts one embodiment of packet flow for an inbound update unit 900. The ISU 800, 900 receives the SAUpdate field 802, 902 for inbound packets from the DRU (dual channel). The SA updates are processed in strict order according to the order tag and depending on the ordering mode. The SAUpdate field and the decapsulation parameters contain all of the information required to update the SA. The ISU uses the address in the SAUpdate field to read the current value of the SA from memory (blocks 806 and 904). The returned data is modified using the SAUpdate information and returned to memory (blocks 810 and 906).

The ISU validates the SAUpdate policy information with the parameters of the resulting decapsulated packet (inner IP header for tunnel mode). The ISU will not assign the SA update "write" to memory until the packet status is received from the DRU as the error information is included in the SA update information.

Once the SAUpdate has occurred a pass or fail indication 812, 908 is sent to the DRU. The DRU uses the resulting status to acknowledge that the packet has been completely processed and can be released to the targeted output device. If the update fails, the SAUpdate address is returned in the packet status field by the DRU.

The ISU is capable of processing up to 8 outstanding update requests from the DRU. The buffering in the DRU is used to hide the latency of the pipelined memory access from the ISU for the outstanding read requests.

In strict ordering mode, the ISU can accept 4 requests from each DRU channel, but it will always process them in strict order according to the LDU_TAG. In source ordering mode, the ISU processes the data from each DRU channel independently in a round robin fashion.

The ISU enforces soft and hard expirations for security associations for lifebyte and sequence number exhaustion. The life-time expiration is received from the PSU. Expiration messages for inbound packets are always generated by the ISU.

Figure 10:
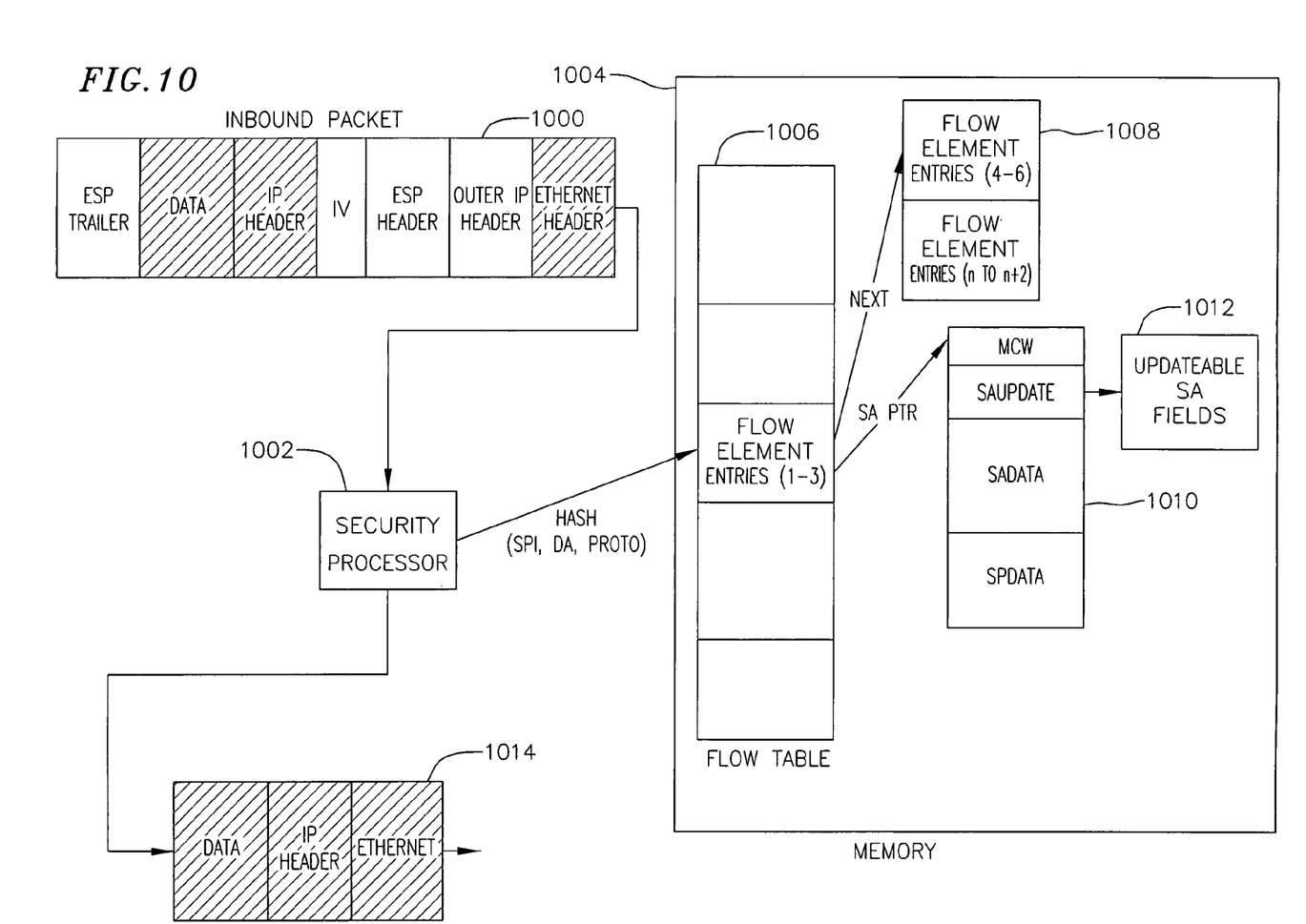
FIG. 10 is a diagram representative of one embodiment of inbound data flow in accordance with the invention.

FIG. 10 depicts one embodiment of inbound processing flow. The inbound packet flow is accomplished in essentially the same manner as outbound packets discussed above in conjunction with FIG. 5. One difference may be that the security processor 1002 uses an indirect pointer to locate the SA updateable fields 1012. The SAUpdate field in the security association information 1010 indicates the location of the updateable fields 1012, but the updateable fields are not part of the information fetched with the packet prior to processing. The security processor 1002 contains a different set of hash tables for inbound packets 1000 as a completely independent lookup. For both inbound and outbound packets, the host manages the SA Data Structure.

Figure 11:
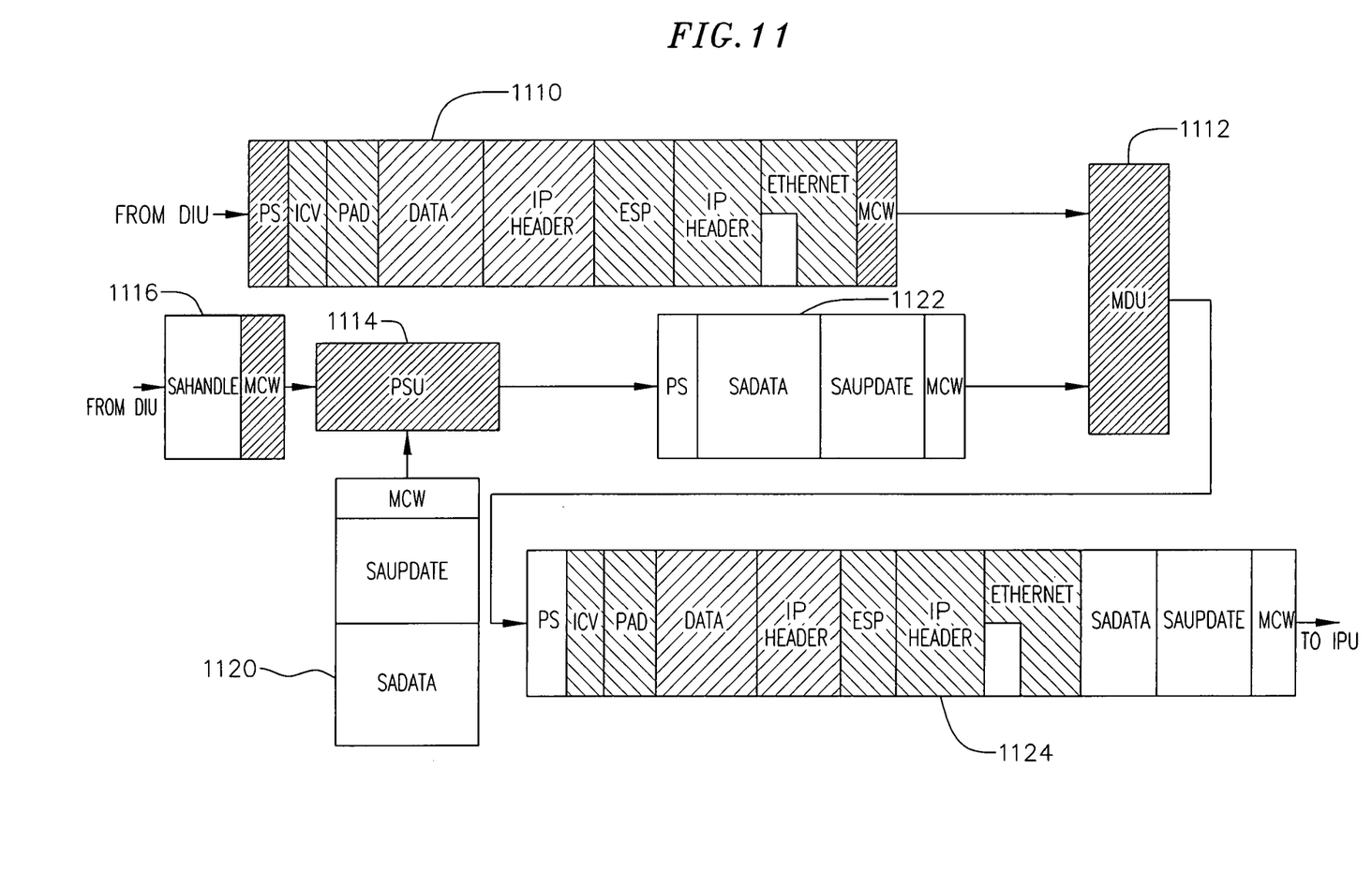
FIG. 11 is a diagram representative of one embodiment of inbound packet flow in accordance with the invention.

FIG. 11 depicts one embodiment of inbound packet flow. As depicted in FIG. 11 and as discussed above in conjunction with FIG. 6, the security processor includes a policy lookup unit 1114 and a merge data unit ("MDU") 1112. The policy lookup unit ("PSU") 1114 receives packet information 1116 from the data input unit ("DIU") 428 (FIG. 4) to retrieve, when applicable, security association information 1120 that is used to process an incoming encrypted packet 1110. In one embodiment, the SAUpdate in the security association information 1120 comprises the address of the updateable information in data memory. The merge data unit 1112 merges the security association information 1122 with the incoming packet 1110 from the data input unit 428.

As discussed above in conjunction with FIG. 6, the MDU thereby provides a traffic merge functionality between the PSU and the DIU. The MDU uses the two management control words ("MCWs") from the PSU to merge data from both the PSU and the DIU (bitwise OR of the MCWs).

It should be appreciated that the inventions described herein are applicable to and may utilize many different protocols and standards and modifications and extensions of those protocols and standards including, for example and without limitation, IP, TCP, UDP, ICMP, IPsec, SSL and FCsec. Moreover, a variety of cryptographic and signature algorithms and modifications and extensions thereof may be used. The invention may be practiced using tunnel mode and/or transport mode packet processing.

It should also be appreciated that the inventions described herein may be constructed using a variety of physical components and configurations. For example, a variety of hardware and software processing components may be used to implement the functions of the host processors, security processors, network processors and the Ethernet processors/controllers and the other components and processes described herein. These hardware and software components include, without limitation, processors and associated data memory, state machines and logic and may involve execution of software, firmware or other code. Such components may be combined on one or more integrated circuits. For example, several of these components may be combined within a single integrated circuit. Some components may be implemented as a single integrated circuit. Some components may be implemented using several integrated circuits.

In addition, the components and functions described herein may be connected in many different ways. Some of the connections represented by the lead lines in the drawings may be in an integrated circuit, on a circuit board, over a backplane to other circuit boards, over a local network and/or over a wide area network (e.g., the Internet). Thus, some of the components may be located in a remote location with respect to the other components. Typically, one or more of the connections represented by the lead lines in the drawings may, for example, comprise a data network. In addition, these connections may be made with physical wire, fiber and/or wireless connections, for example.

A wide variety of devices may be used to implement the data memories (e.g., the databases and non-volatile memories) discussed herein. For example, a data memory may comprise one or more RAM, disk drive, SDRAM, FLASH or other types of data storage devices.

The invention may be practiced using different types of cipher engines. For example, in one embodiment of the invention data is decrypted using a block cipher, rather than a stream cipher.

In summary, the invention described herein teaches improved packet processing techniques. While certain exemplary embodiments have been described in detail and shown in the accompanying drawings, it is to be understood that such embodiments are merely illustrative of and not restrictive of the broad invention. In particular, is should be recognized that the teachings of the invention apply to a wide variety of systems and processes that are configurable. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A packet processing method comprising:
   receiving a plurality of packets;
   receiving a security association handle for each packet in the plurality of packets, wherein the security association handle includes a set of selectors;
   for each packet, identifying a flow entry for the packet, including:
      determining a flow element address for the packet,
      retrieving a first flow element using the flow element address, wherein the first flow element includes a plurality of flow entries,
      determining whether a selector in the set of security association handle selectors is present in one of the plurality of flow entries, and
      retrieving a second flow element if a selector in the set of security association handle selectors is not present in one of the plurality of flow entries;
   retrieving security association information for each packet using the identified flow entry;
   generating header information for each of the plurality of packets;
   adding the header information to each of the plurality of packets to generate encapsulated packets; and
   distributing the encapsulated packets to a plurality of cryptographic processors.

2. The method of claim 1 wherein the information comprises one or more of the group consisting of sequence number and byte count.

3. The method of claim 1 wherein the encapsulated packets comprise IPsec packets.

4. The method of claim 1 wherein packets are encapsulated on a per-packet basis.

5. The method of claim 1 wherein the packets are received from a host processor.

6. The method of claim 1, wherein determining a flow element address includes:
   hashing the selectors in the set of security association handle selectors to generate the flow element address.

7. The method of claim 1, wherein the step of determining a flow element address includes:
   retrieving a security parameter index from the set of security association handle selectors; and
   using the retrieved security parameter index as the flow element address.

8. The method of claim 1, further comprising:
   processing each encapsulated packet based on the retrieved security association information for the packet; and
   transmitting the processed packet.

9. The method of claim 1, further comprising:
   modifying at least a portion of the retrieved security association information; and
   generating header information for the packets including a portion of the modified security association information.

10. A packet processing method comprising:
    receiving a plurality of packets comprising header information and encrypted data;
    receiving a security association handle for each packet in the plurality of packets, wherein the security association handle includes a set of selectors;
    for each packet, identifying a flow entry for the packet, including:
       determining a flow element address for the packet,
       retrieving a first flow element using the flow element address, wherein the first flow element includes a plurality of flow entries,
       determining whether a selector in the set of security association handle selectors is present in one of the plurality of flow entries, and
       retrieving a second flow element if a selector in the set of security association handle selectors is not present in one of the plurality of flow entries;
    retrieving security association information for each packet using the identified flow entry;
    distributing the packets to a plurality of cryptographic processors;
    decrypting the encrypted portion of each packet based on a portion of the security association information retrieved for the packet;
    modifying, by a common processing component, at least a portion of the header information of the decrypted packets; and
    transmitting the decrypted packets.

11. The method of claim 10 wherein the at least a portion of the header information comprises one or more of the group consisting of sequence number and byte count.

12. The method of claim 10 wherein the encrypted packets comprise IPsec packets.

13. The method of claim 10 wherein the at least a portion of the header information is modified on a per-packet basis.

14. The method of claim 10 wherein the packets are transmitted to a host processor.

15. The method of claim 10 wherein determining a flow element address includes:
    hashing the selectors in the set of security association handle selectors to generate the flow element address.

16. The method of claim 10, wherein the step of determining a flow element address includes:
    retrieving a security parameter index from the set of security association handle selectors; and
    using the retrieved security parameter index as the flow element address.

17. A packet processing system comprising:
    at least one media access controller for receiving a plurality of packets;
    at least one data memory for storing security association information; and
    a cryptographic processing module, wherein the cryptographic processing module includes:
       a policy lookup unit configured to identify a flow associated with each of the received plurality of packets by determining a flow element address for the packet, retrieving a first flow element using the flow element address, wherein the first flow element includes a plurality of flow entries, determining whether a selector in the set of security association handle selectors is present in one of the plurality of flow entries, and retrieving a second flow element if a selector in the set of security association handle selectors is not present in one of the plurality of flow entries and further configured to retrieve a security association for each identified flow;

a merge data unit coupled to the policy lookup unit configured to merge a portion of the security association retrieved by the policy lookup unit with the associated packet, a plurality of cryptographic processors, each coupled to the merge data unit for performing cryptographic operations on the merged packets.

18. The packet processing system of claim 17 wherein the at least a portion of the security association information comprises one or more of the group consisting of sequence number and byte count.

19. The packet processing system of claim 17, wherein the cryptographic processing module further comprises:

a distributor coupled between the merge data unit and the plurality cryptographic processors for distributing merged packets to the plurality of cryptographic processors.

20. A method for determining security association information in a cryptographic processor comprising:

receiving a security association handle for a packet, wherein the security association handle includes a set of selectors;

identifying a flow entry for the packet, including:
  determining a flow element address for the packet,
  retrieving a first flow element using the flow element address, wherein the first flow element includes a plurality of flow entries, and
  determining whether a selector matching a selector in the set of security association handle selectors is present in one of the plurality of flow entries,
  retrieving a second flow element if a selector in the set of security association handle selectors is not present in one of the plurality of flow entries;

retrieving security association information using the identified flow entry; and transmitting at least a portion of the retrieved security association information to a cryptographic processing engine.

21. The method of claim 20, further comprising:

retrieving a second flow element if a selector in the set of security association handle selectors is not present in one of the plurality of flow entries.

22. The method of claim 20, wherein determining a flow element address includes:

hashing the selectors in the set of security association handle selectors to generate the flow element address.

23. The method of claim 20, wherein the step of determining a flow element address includes:

retrieving a security parameter index from the set of security association handle selectors; and using the retrieved security parameter index as the flow element address.

\* \* \* \* \*